(12) United States Patent
Knupfer

(10) Patent No.: US 6,373,559 B1
(45) Date of Patent: Apr. 16, 2002

(54) OPTOELECTRONIC MIXER

(75) Inventor: Klaus Knupfer, Essingen (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

(21) Appl. No.: 09/487,872

(22) Filed: Jan. 20, 2000

(30) Foreign Application Priority Data

Jan. 23, 1999 (DE) ........................................ 199 02 612

(51) Int. Cl.$^7$ ................................................ G01C 3/08
(52) U.S. Cl. ........................................ 356/5.15; 356/5.1
(58) Field of Search .................................. 356/5.1, 5.15

(56) References Cited

U.S. PATENT DOCUMENTS

| | | | |
|---|---|---|---|
| 3,619,058 A | * | 11/1971 | Hewlett et al. |
| 4,274,736 A | * | 6/1981 | Balmer |
| 5,535,044 A | * | 7/1996 | Takeshima et al. ......... 359/245 |
| 5,591,962 A | * | 1/1997 | Koishi et al. ............ 250/214.1 |
| 5,721,424 A | | 2/1998 | Price |

FOREIGN PATENT DOCUMENTS

| | | | |
|---|---|---|---|
| DE | 196 43 287 | | 4/1998 |
| JP | 2000-216425 | * | 8/2000 |

* cited by examiner

Primary Examiner—Stephen C. Buczinski
(74) Attorney, Agent, or Firm—Walter Ottesen

(57) ABSTRACT

The invention is directed to an optoelectronic mixer for demodulating a high-frequency light signal amplitude modulated at a signal frequency ($f_{sig}$) The optoelectronic mixer includes a light sensor for receiving and converting the light signal into free charge carriers. The light sensor has at least two individually drivable sensor electrodes and a reference frequency generator supplies an alternating-current voltage at a reference frequency ($f_{ref}$). The reference frequency generator is connected to the sensor electrodes to alternately conduct the charge carriers to the one or the other of the sensor electrodes at the reference frequency ($f_{ref}$).

10 Claims, 2 Drawing Sheets

OPTOELECTRONIC MIXER

BACKGROUND OF THE INVENTION

An optoelectronic mixer or demodulator is known from German patent publication 196 43 287. In the mixer disclosed here, an avalanche photodiode (AFD) converts a high frequency amplitude modulated light signal into free charge carriers. The avalanche photodiode is connected to a reference frequency generator in order to convert the high frequency light signal with the suitable mixer frequency or reference frequency into a low frequency range.

The avalanche photodiode serves as a light sensor in this known optoelectronic mixer and must be biased in the non-conducting direction with a high voltage. The avalanche photodiode has an inherent noise which is greater than the photon noise of the light signal and has a high level of amplification which, however, is very sensitive to high voltage and temperature. For these reasons, a relatively complex calibration device is required when the known mixer described in German patent publication 196 43 287 is used in a distance measuring apparatus.

The electrooptical mixer known from U.S. Pat. No. 5,721,424 has an avalanche photodiode as a light sensor. In this electrooptical mixer, temperature dependency, non-linear AFD characteristic line and inherent noise of the AFD considerably affect the mixing efficiency.

SUMMARY OF THE INVENTION

In view of the above, it is an object of the invention to provide an optoelectronic mixer which offers a good mixing efficiency while at the same time providing reduced circuit complexity and reduced complexity with respect to its assembly.

The optoelectronic mixer of the invention is for demodulating a high-frequency light signal amplitude modulated at a signal frequency ($f_{sig}$). The optoelectronic mixer includes: a light sensor for receiving and converting the light signal into free charge carriers; the light sensor having at least two individually drivable sensor electrodes; a reference frequency generator for supplying an alternating-current voltage at a reference frequency ($f_{ref}$); and, the reference frequency generator being connected to the sensor electrodes to alternately conduct the charge carriers to the one or the other of the sensor electrodes at the reference frequency ($f_{ref}$).

The reference frequency generator can apply complementary alternating voltages to the at least two individually drivable sensor electrodes of the light sensor. For this reason, the charge carriers are conducted alternately to the one or the other of the two sensor electrodes at the reference clock frequency. The charge carriers are generated at the amplitude modulation clock frequency on the light sensor. This is a multiplicative mixing operation which need not be burdened with a significant inherent noise which is different than for an avalanche photodiode as a light sensor.

In accordance with an advantageous embodiment of the invention, the light sensor is a multisegment photodiode having a plurality of individual contact segments arranged at a spacing from each other. The at least two individually drivable electrodes are formed from two segments. The simplest multisegment photodiode is a difference diode having two segments mounted on a monolithic semiconductor crystal separated by a gap of several $\mu$m to several 10 $\mu$m. These segments are low-ohmage transparent areas and collect all charge carriers generated at the specific segment and conduct these charged carriers away as a detectable electric current via the contacts of the segments. With the invention, an optoelectronic mixer or modulator can be built with difference diodes or even quadrant diodes. The difference diodes are relatively non-critical in operation and can be obtained in large numbers and variety. In addition, multisegment photodiodes are effective light sensors already at a low biasing voltage, for example, 5 Volts. For this reason, the complexity of the circuit of the mixer according to the invention is considerably reduced compared to the state of the art.

It has been surprisingly determined that the mixing operation takes place only in the region between the segments of a multisegment photodiode. For this reason, an especially high mixing efficiency results when an optical imaging device images the light signal into a region lying between two segments of a multisegment photodiode and the two sensor electrodes are formed by the segments next to this region. The light of this light signal, which falls into the gap or the region between the segments of a multisegment photodiode, is unexpectedly converted into charge carriers. These photoelectrons or holes are negligible for most applications and are generated in the gap and migrate to the two neighboring segments. In the event that the two segments are at the same blocking voltage, which corresponds to the usual application of a multisegment photodiode, the charge carriers, which are generated in the gap, distribute to the two neighboring segments. The distribution ratio could be dependent upon the position of the light spot in the gap. If now two neighboring segments are placed at blocking voltages of different magnitude, then the electrons (holes), which are generated in the gap, preferably migrate to the more positive (more negative) electrode.

In a further embodiment, the individual segments of the multisegment photodiode are covered so as to be impermeable to light. In this way, the surrounding light or ambient light, which could lead to additional photon noise and to overdriving, is greatly attenuated.

Surprisingly, it has been determined that the electrodes to which the reference frequency is applied, should not themselves contribute to the conversion of light into the charge carriers and that, for a multisegment photodiode as a light sensor, the gap region between the segments (which is usually deemed to be negligible), is essential for the function as an optoelectronic mixer. The light sensitivity of the segments themselves is to be suppressed as completely as possible.

In the event that the light sensor is coated with a spectral filter adapted to the wavelength range of the light signal carrier wave, disturbance light sources are suppressed with even greater efficiency. In this context, it is noted that under "light" herein each signal carrier is understood for which there is a suitable sensor. The invention is therefore in no way limited to the spectral range of the visible light.

In a further embodiment, the reference frequency generator is connected via very small capacitors to the sensor electrodes. Especially for a multisegment photodiode as light sensor, the reference frequency can be effectively coupled into the light sensor while saving current.

According to a further advantageous embodiment, the segments of a multisegment photodiode are biased in the blocking direction via high-ohmage resistors. This is so, because at low mixing frequencies, which arise at a low frequency spacing of the signal frequency to the reference frequency, the voltage signals can be evaluated very efficiently by the corresponding high-ohmage amplifier circuits and have low noise.

When high-impedance amplifiers are connected between the sensor electrodes and an evaluation unit for buffering and lowpass filtering of the voltage signals coming from the sensor electrodes, the high frequency signals can be separated in a manner known per se from the low frequency signals applied for the evaluation.

In accordance with another viewpoint, the invention relates to the use of an optoelectronic mixer of the invention in a distance measuring apparatus having a light transmitter transmitting the amplitude modulated light signal to the object to the measured. The light sensor detects the reflected light signal coming back from the object and an evaluation unit determines the phase shift between the transmitted and the returning light signal. The distance measuring apparatus provided in this way can be easily evaluated even for low light power, that is, a great distance of the object and/or low energy consumption and with high amplitude modulation frequency, that is, a high distance measuring accuracy. This is so because, with the optoelectronic mixer of the invention, the conversion into a low frequency range is carried out at a location in the signal path where no wideband electrical amplification has yet taken place.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
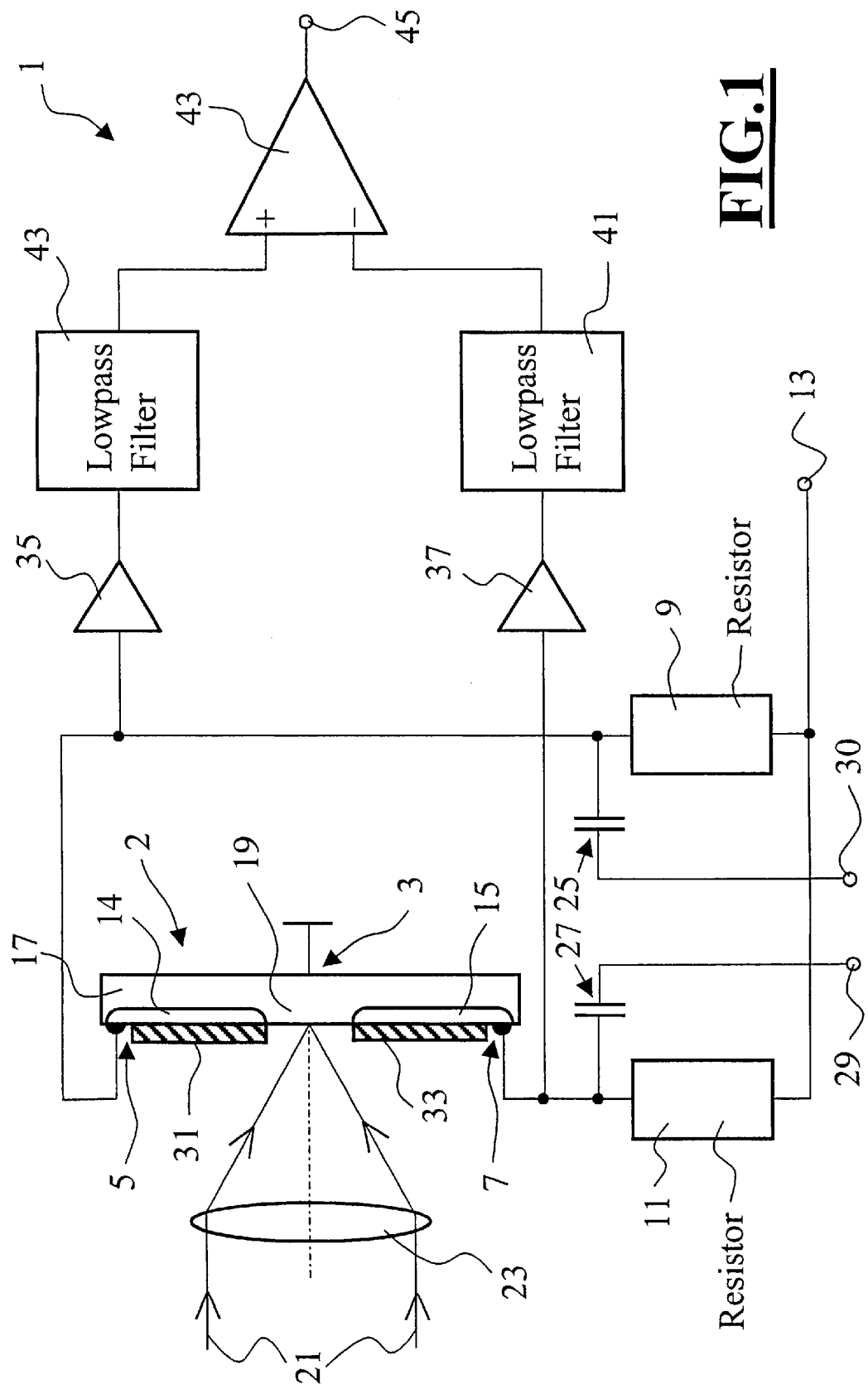
FIG. 1 is a schematic of an electrooptical mixer according to the invention.

The embodiment shown in FIG. 1 is of an optoelectronic mixer I according to the invention. The optoelectronic mixer 1 includes, as a light sensor, a multisegment photodiode configured as a difference diode 2. This difference diode 2 includes an electrode 3 at ground potential and two individually drivable sensor electrodes 5 and 7 which lie at a blocking voltage or reverse bias of, for example, 5 to 15 Volts via very high resistors 9 and 11 and via an input 13. The resistors 9 and 11 are, for example, 10 MΩ.

The sensor electrodes 5 and 7 include low impedance, transparent segment areas 14 and 15. These segments 14 and 15 arranged on a monolithic semiconductor crystal 17 are used as light sensitive sensor regions in the use of a multisegment photodiode as known from the state of the art.

Region 19 of the difference diode 2 separates the segments 14 and 15. According to the invention, the region 19 of the difference diode 2 is the light sensitive sensor element on which a light signal 21 is imaged with the aid of an imaging optic 23 shown schematically in FIG. 1. The light sensitive sensor region 19 is typically several $\mu$m to several 10 $\mu$m wide.

The sensor electrodes 5 and 7 are supplied with complementary alternating voltages at the reference frequency $f_{ref}$ from a reference generator (not shown in FIG. 1) via small capacitors 25 and 27 and via reference frequency inputs 29 and 30. The capacitors 25 and 27 have a capacitance of 1 pF to 10 pF, for example. The reference frequency $f_{ref}$ can, for example, be several 100 MHz and the amplitude of this alternating voltage can be several Volts. However, this amplitude does not exceed the biasing voltage at the input 13.

The photoelectrons which are generated in the light sensitive region 19 (that is, the gap between the segments 14 and 15) migrate in correspondence to the reference frequency $f_{ref}$ selectively to the sensor electrode 5 or to the sensor electrode 7 whereby a multiplicative mixing operation is effected between the light signal 21 and the reference frequency $f_{ref}$. The light signal 21 is amplitude modulated at a signal frequency $f_{sig}$.

For this multiplicative mixing operation, it has been found that only that light contributes which incidents upon the light sensitive region 19. For this reason, the segments 14 and 15 advantageously have light impermeable cover layers 31 and 33.

The signals taken off at the sensor electrodes 5 and 7 are buffered and filtered via high impedance amplifiers 35 and 37 (preferably, FET amplifiers) and lowpass filters 39 and 41 connected downstream of the amplifiers. This buffering and filtering is such that the signal components having the signal frequency $f_{sig}$, the reference frequency $f_{ref}$ and the sum frequency $f_{sig}+f_{ref}$ are suppressed. The output signal is formed by difference formation with the downstream difference amplifier 43. This output signal includes essentially only the difference frequency $f_{sig}-f_{ref}$. The mixing signal having the difference frequency $f_{sig}-f_{ref}$ can be taken off for further processing at the output 45.

In this embodiment, the resistors 9 and 11 can be of extremely high ohmage at low difference frequency whereby, even for a low intensity of the light signal 21, signals result which can be well evaluated. Nowhere, except in the generation of the reference frequency, high-frequency signals have to be processed, and therefore, the signal frequency of the light signal 21 can be selected very high without greater evaluation effort. The supply voltage does not have to exceed the range of conventional apparatus low voltages such as 15 Volts. For this reason, all components can be designed so as to have low currents with the exception of the reference frequency generator.

Figure 2:
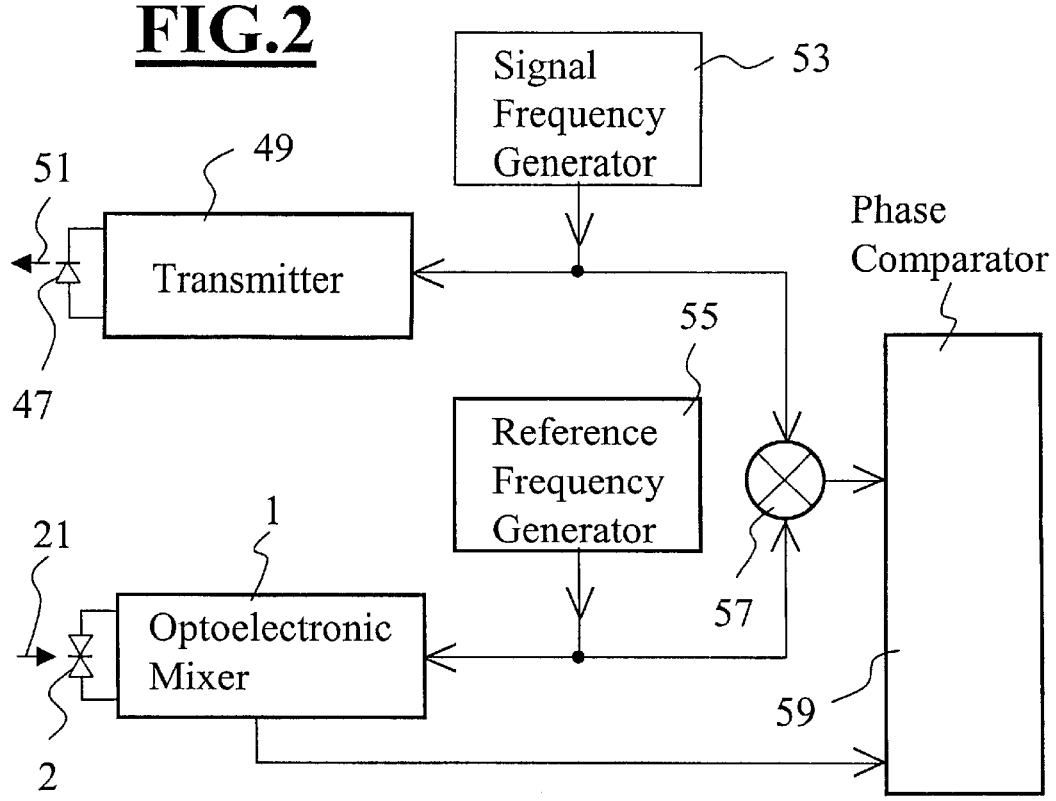
FIG. 2 is a block diagram of a distance measuring apparatus in corporating the electrooptical mixer according to the invention; and, FIG. 3 is a block diagram of another distance measuring apparatus incorporating an electrooptical mixer according to the invention.

In FIG. 2, a distance measuring apparatus is shown which includes the electrooptical mixer 1 of FIG. 1. The distance measuring apparatus is shown as a block circuit diagram. The transmitting unit 49 having a diode laser 47 emits an amplitude modulated light signal 51 to an object (not shown) to be measured. The light signal 51 is reflected from this object and is detected as light signal 21 by the electrooptical mixer 1 which includes the difference diode 2.

A signal frequency generator 53 generates the signal frequency $f_{sig}$, which is superposed on the amplitude of light signal 51, and a reference frequency generator 55 generates the reference frequency $f_{ref}$ which differs from the signal frequency $f_{sig}$ only by a relatively small amount $f_{NF}$. The reference frequency $f_{ref}$ is supplied to the demodulator or electrooptical mixer 1 via its reference frequency inputs 29 and 30 shown in FIG. 1. The signal frequency $f_{sig}$ and the reference frequency $f_{ref}$ are supplied to a further mixer 57 from the signal generator 53 or the reference frequency generator 55. The mixer 57 is connected at its output end to a phase comparator 59 which is also connected to the output 45 (shown in FIG. 1) of the electrooptical mixer 1 in order to compare the phase superposed on the transmitted light signal 51 to the phase position of the received light signal 21. From this comparison, the distance of the reflecting object can be determined.

Figure 3:
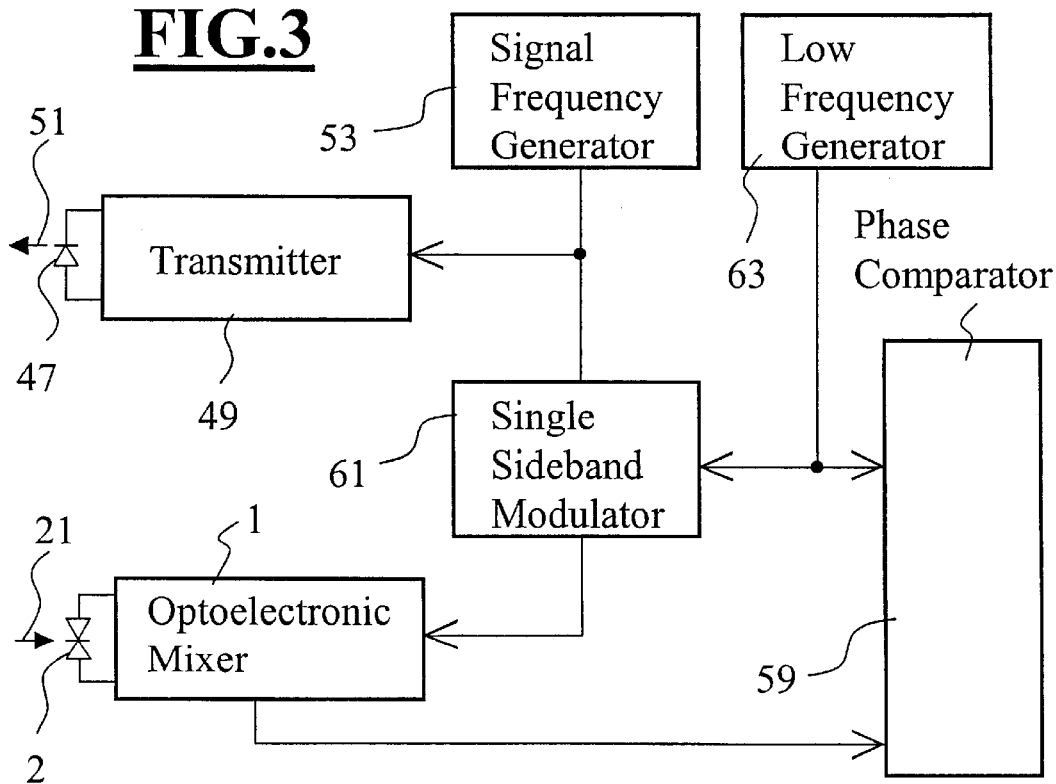

In FIG. 3, a further embodiment of a distance measuring apparatus is shown which includes the electrooptical mixer 1. The elements of FIG. 3 which correspond to the elements of FIG. 2 have the same reference numerals as in FIG. 2.

In contrast to the distance measuring apparatus of FIG. 2, the reference frequency $f_{ref}$ in the distance measuring apparatus of FIG. 3 is not generated by a separate reference frequency generator but by a frequency shifter 61 from the signal frequency $f_{sig}$. The frequency shifter 61 is configured as a single sideband modulator SSM. For this purpose, a low frequency generator 63 generates the low frequency $f_{NF}$, which is low compared to the signal frequency $f_{sig}$ and which is added by the frequency shifter 61 to the signal frequency $f_{sig}$ or is subtracted from the signal frequency $f_{sig}$. In this way, the reference frequency $f_{ref}$ is generated and is then supplied to the electrooptical mixer 1.

The electrooptical mixer 1 generates, in turn, a measuring signal having the low frequency $f_{NF}$ from the signal frequency $f_{sig}$ and the reference frequency $f_{ref}$. The signal frequency $f_{sig}$ is superposed on the received light signal 21 and the reference frequency $f_{ref}$ is supplied to the electrooptical mixer 1 via the frequency shifter 61. The phase position of this measurement signal is rigidly coupled to the phase position of the generator 63 because the measuring signal is derived from the frequency of the generator 63 via two mixing operations (first in frequency shifter 61 and then in mixer 1). The measuring signal, however, is subjected to a phase shift which is caused by the running times in the transmitter unit 49 and in the mixer 1 as well as especially by the optical path corresponding to the distance measuring principle. The optical path is the path which the transmitted light passes over from the transmitting unit 49 to the receiver, that is, to the difference diode 2. This phase shift is measured in the phase comparator 59 and is an index for the distance.

It is understood that the foregoing description is that of the preferred embodiments of the invention and that various changes and modifications may be made thereto without departing from the spirit and scope of the invention as defined in the appended claims.

What is claimed is:

1. An optoelectronic mixer for demodulating a high-frequency light signal amplitude modulated at a signal frequency ($f_{sig}$), the optoelectronic mixer comprising:
    a light sensor for receiving and converting said light signal into free charge carriers;
    said light sensor having at least two individually drivable sensor electrodes on which respective voltage signals are outputted;
    a reference frequency generator for supplying an alternating-current voltage at a reference frequency ($f_{ref}$);
    said reference frequency generator being connected to said sensor electrodes to alternately conduct said charge carriers to the one or the other of said sensor electrodes at said reference frequency ($f_{ref}$);
    high-impedance amplifiers connected to corresponding ones of said sensor electrodes for buffering and lowpass filtering said voltage signals, respectively; and,
    a difference amplifier having first and second inputs for receiving corresponding ones of the buffered and lowpass filtered signals to form an output signal having a difference frequency ($f_{sig}-f_{ref}$).

2. The optoelectronic mixer of claim 1, wherein said light sensor is a multi-segment photodiode having individual segments disposed in spaced relationship to each other and connected to said reference frequency generator; and, said sensor electrodes being defined by corresponding ones of said individual segments.

3. The optoelectronic mixer of claim 2, said individual segments conjointly defining a region therebetween on said light sensor; and, said optoelectronic mixer further comprising an imaging device for imaging said light signal on said region.

4. The optoelectronic mixer of claim 3, each of said individual segments of said light sensor being covered by a light impermeable coating.

5. The optoelectronic mixer of claim 1, wherein said light signal has a carrier wave having a pregiven wavelength range; and, said optoelectronic mixer further comprises a spectral filter on said light sensor and said spectral filter is matched to said wavelength range of said carrier wave.

6. The optoelectronic mixer of claim 1, further comprising capacitors for connecting said reference frequency generator to corresponding ones of said sensor electrodes.

7. The optoelectronic mixer of claim 2, further comprising a bias source for providing a bias voltage; and, high-ohmage resistors for connecting said bias source to corresponding ones of said sensor electrodes so as to reverse bias said sensor electrodes.

8. The optoelectronic mixer of claim 1, further comprising lowpass filters connected between corresponding ones of said high-impedance amplifiers and said respective inputs of said difference amplifier.

9. A distance measuring apparatus for measuring the distance to an object, the distance measuring apparatus comprising:
    a light transmitter for generating a light signal amplitude modulated at a signal frequency ($f_{sig}$) and transmitting said light signal to the object where said light signal is reflected back to said apparatus;
    an optoelectronic mixer for demodulating the reflected light signal, the optoelectronic mixer including: a light sensor for detecting and converting said light signal into free charge carriers; and, said light sensor having at least two individually drivable sensor electrodes;
    a reference frequency generator for supplying an alternating-current voltage at a reference frequency ($f_{ref}$);
    said reference frequency generator being connected to said sensor electrodes to alternately conduct said charge carriers to the one or the other of said sensor electrodes at said reference frequency ($f_{ref}$); and,
    a phase comparator connected to said light transmitter and said optoelectronic mixer for detecting the phase shift between said light signal transmitted by said light transmitter and the light signal reflected back from said object.

10. A distance measuring apparatus for measuring the distance to an object, the distance measuring apparatus comprising:
    a signal frequency generator for generating a signal frequency ($f_{sig}$);
    a light transmitter for generating a light signal amplitude modulated at said signal frequency ($f_{sig}$) and transmitting said light signal to the object where said light signal is reflected back to said apparatus;
    an optoelectronic mixer for demodulating the reflected light signal, the optoelectronic mixer including: a light sensor for detecting and converting said light signal into free charge carriers; and, said light sensor having at least two individually drivable sensor electrodes;

a single sideband modulator for generating an alternating-current voltage having a reference frequency ($f_{ref}$) from said signal frequency ($f_{sig}$);

said single sideband modulator being connected to said sensor electrodes to alternately conduct said charge carriers to the one or the other of said sensor electrodes at said reference frequency ($f_{ref}$); and, a phase comparator connected to said light transmitter and said optoelectronic mixer for detecting the phase shift between the light signal transmitted by said light transmitter and the light signal reflected back from said object.

* * * * *